(12) United States Patent
Ayarturk

(10) Patent No.: US 8,616,606 B2
(45) Date of Patent: Dec. 31, 2013

(54) GLOVE AND STORAGE BOX ASSEMBLY

(75) Inventor: Hasan Ayarturk, Bursa (TR)

(73) Assignee: Tofas Turk Otomobil Fabrikasi Anonim Sirketi, Bursa (TR)

( * ) Notice: Subject to any disclaimer, the term of this patent is extended or adjusted under 35 U.S.C. 154(b) by 0 days.

(21) Appl. No.: 13/517,034

(22) PCT Filed: Dec. 18, 2009

(86) PCT No.: PCT/IB2009/055856
§ 371 (c)(1),
(2), (4) Date: Jun. 18, 2012

(87) PCT Pub. No.: WO2011/073736
PCT Pub. Date: Jun. 23, 2011

(65) Prior Publication Data
US 2012/0256439 A1    Oct. 11, 2012

(51) Int. Cl.
*B60R 7/06* (2006.01)
(52) U.S. Cl.
USPC ........................................ 296/37.12; 248/483
(58) Field of Classification Search
USPC ................................ 296/37.8, 37.12; 224/483
See application file for complete search history.

(56) References Cited

U.S. PATENT DOCUMENTS

| | | | |
|---|---|---|---|
| 4,355,837 A * | 10/1982 | Shimizu et al. | 296/37.12 |
| 4,828,236 A | 5/1989 | Inoue | |
| 5,971,461 A * | 10/1999 | Vaishnav et al. | 296/37.12 |
| 6,517,145 B2 * | 2/2003 | Hedderly | 296/192 |
| 6,715,815 B2 * | 4/2004 | Toppani | 296/37.12 |
| 6,945,579 B2 * | 9/2005 | Peck et al. | 296/37.12 |
| 7,422,261 B2 * | 9/2008 | Zellner et al. | 296/37.12 |
| 2007/0182189 A1 * | 8/2007 | Penner | 296/37.12 |
| 2007/0205624 A1 * | 9/2007 | Zellner et al. | 296/37.12 |

FOREIGN PATENT DOCUMENTS

| | | |
|---|---|---|
| EP | 1 350 675 A2 | 10/2003 |
| JP | 2006-069240 | 3/2006 |
| KR | 10-2005-0017459 A | 2/2005 |

OTHER PUBLICATIONS

International Search Report, mailing date of Sep. 13, 2009, for corresponding International Application No. PCT/IB2009/055856.
International Preliminary Report on Patentability, mailing date of Feb. 14, 2012, for corresponding International Application No. PCT/IB2009/055856.

* cited by examiner

*Primary Examiner* — Lori Lyjak
(74) *Attorney, Agent, or Firm* — Intellectual Property Law Group LLP

(57) ABSTRACT

The present invention relates to a glove and storage box assembly (1) which is located in vehicles, into which articles are placed, opened slowly and prevented from vibrating after being opened, has low production cost, does not resist while being dosed and does not make a sound during opening and closing. The inventive glove and storage box assembly (1) essentially comprises at least one shell (2) which has at least one clearance (3) providing access to the chamber formed in the vehicle cockpit in order that articles are placed on thereof and at least one cover (4) which is disposed on the shell (2) and ensures to access the clearance (3) from out-side by opening and closing.

20 Claims, 11 Drawing Sheets

GLOVE AND STORAGE BOX ASSEMBLY

FIELD OF THE INVENTION

Figure 1:
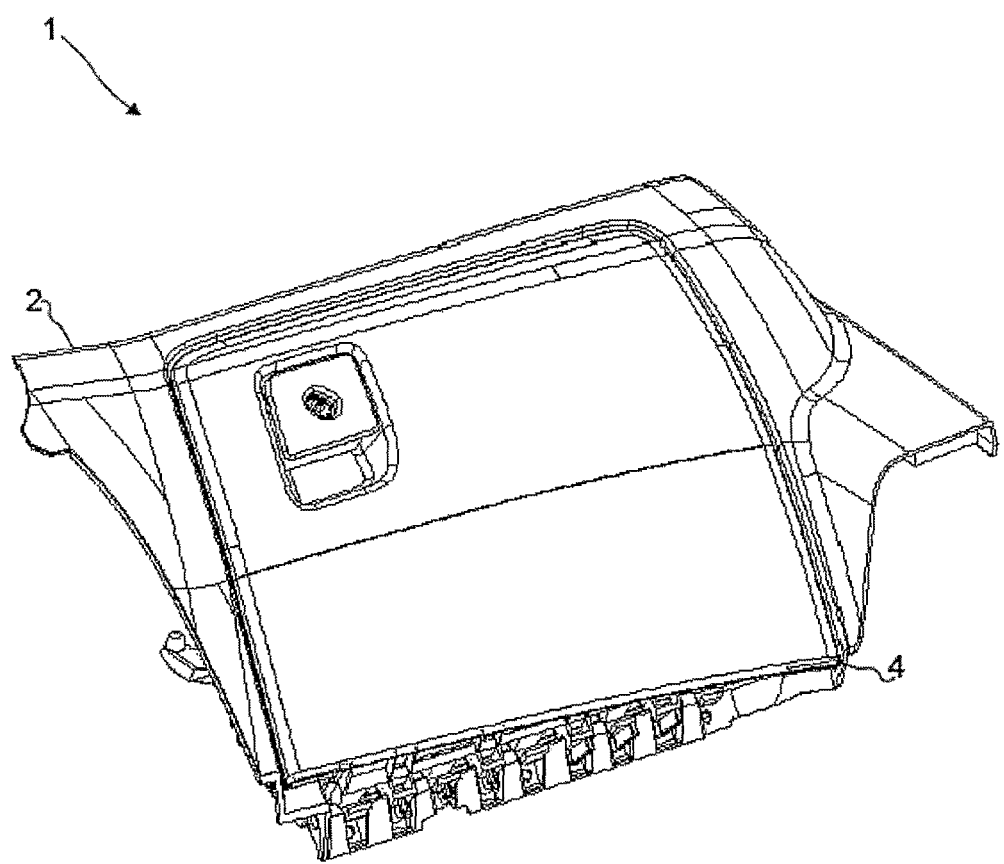

The present invention relates to a glove and storage box assembly which is located in vehicles, into which articles are placed, which is opened slowly and prevented from vibrating after being opened.

BACKGROUND OF THE INVENTION

Glove and storage box assemblies known in the art are opened by free fall method. The moving part and the fixed part collide when fully open position is reached as a result of transformation of the potential energy into the kinetic energy because of the weight during opening. Various methods are used in the technique in order to damp the reactive power which will occur due to the said collision. These methods are briefly as follows: an additional deceleration mechanism which is composed of a rotational damper and gearwheel system, a deceleration and locking mechanism which is composed of a leaf spring produced from spring steel and plastic drive arm on the lower part of the storage box, a mechanism which prevents friction that will occur as a result of the motion by providing friction to the fixed part of the storage box via an angled gusset addition made on the moving part of the storage box. Cost of the gearwheel system which is used to connect the linear and rotational dampers and the said dampers to the storage box is very high. In addition, the resistance force performed while the storage box is opened in the said system is also performed while it is closed and this increases the burden of closing the storage box. The mechanism which is formed by using the leaf spring and the drive arm on the lower part of the storage box increases the cost and the burden of closing as well. In the mechanism wherein the application of angled gusset is used, unwanted noises and deformations arising from plastic friction occur.

The Japanese patent document no. JP2006069240 discloses a glove box cover which can be used in the shape of a tray and which is not vibrated during traveling. At the same time, it is mentioned that the system is quiet since it is not vibrated.

The U.S. Pat. No. 4,828,236 discloses a glove and storage box cover which can reach to a totally opened position from a totally closed or partially opened position with its own weight and prevents sudden openings by means of a damper making an effect contrary to the direction of movement. In the system, the damper size and the place that it occupies are minimized by using a spring instead of using rack and pinion and the service life thereof is prolonged since the opening speed of the cover can be controlled.

The Korean patent document no. KR20050017459 discloses elastic shock absorbers which are installed to the ends of dampers in order to prevent the cover of the vehicle glove box to make a sound during impacts that may occur while it is being opened and closed.

The European patent document no. EP1350675A2 discloses a glove and storage box assembly, which is equipped with an operating mechanism to secure, respectively, release and lock the lid of the glove compartment.

SUMMARY OF THE INVENTION

The objective of the present invention is to realize a glove and storage box assembly which has a low production cost.

Another objective of the invention is to realize a glove and storage box assembly which does not resist while being closed.

Yet another objective of the present invention is to realize a glove and storage box assembly which is prevented from making vibration while it is open.

An additional objective of the present invention is to realize a glove and storage box assembly which does not make a sound during opening and closing.

DETAILED DESCRIPTION OF THE INVENTION

Figure 2:
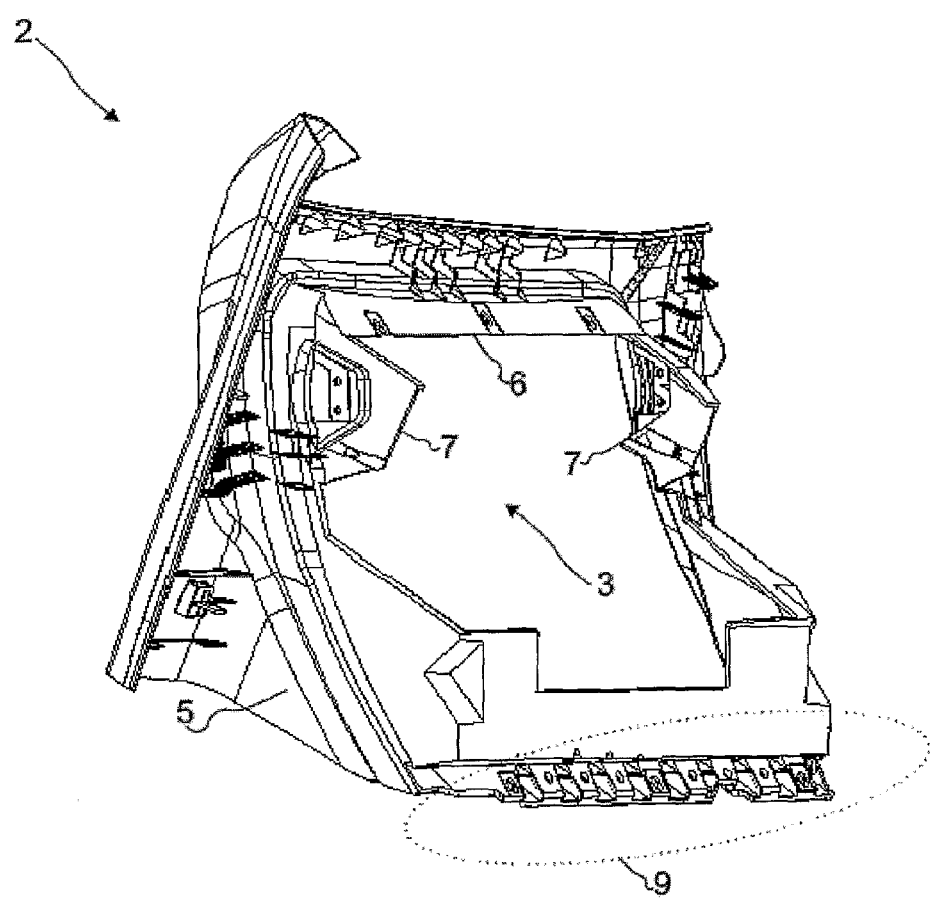
Figure 3:
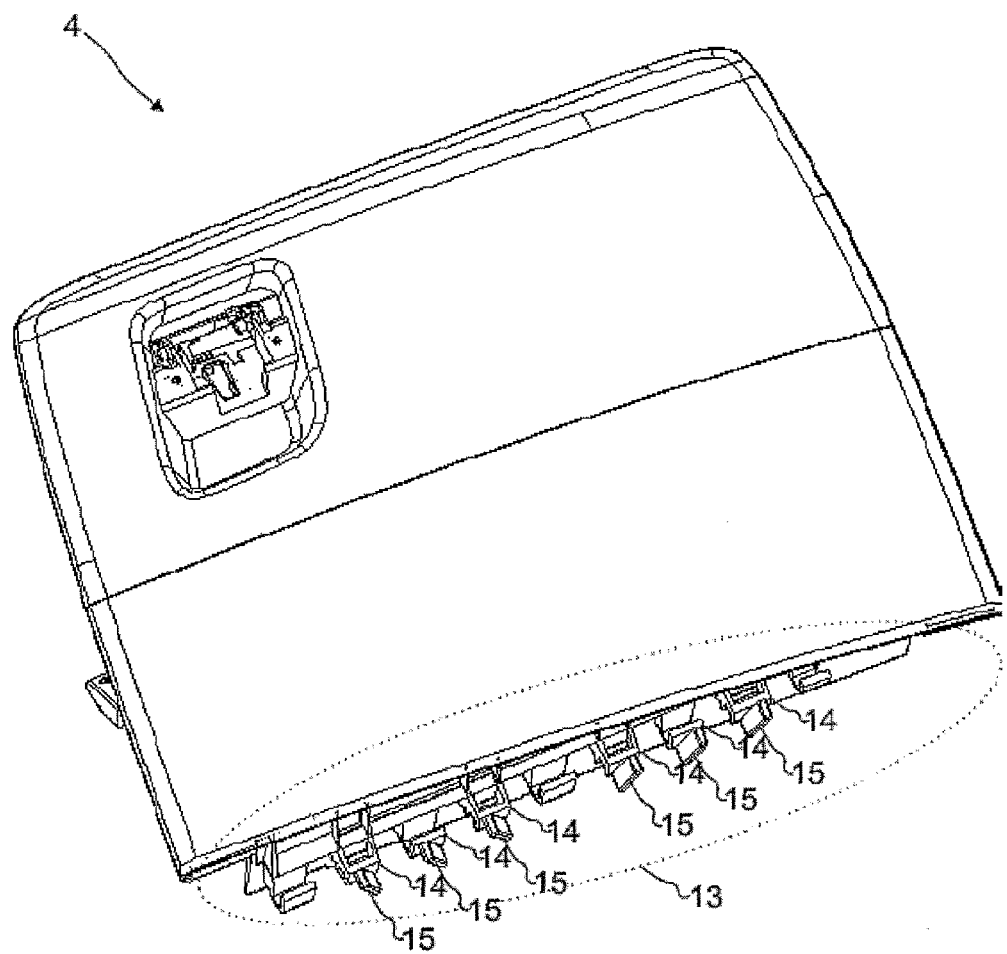
Figure 4:
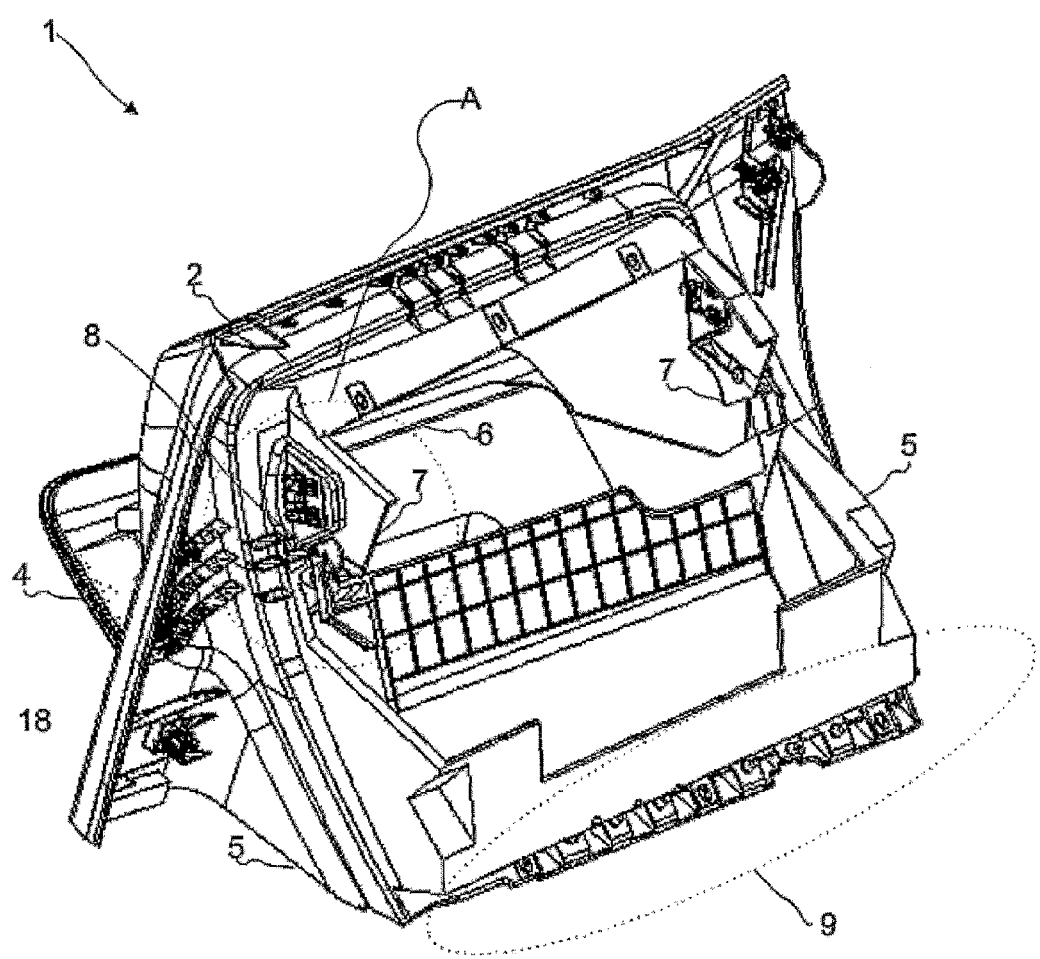
Figure 5:
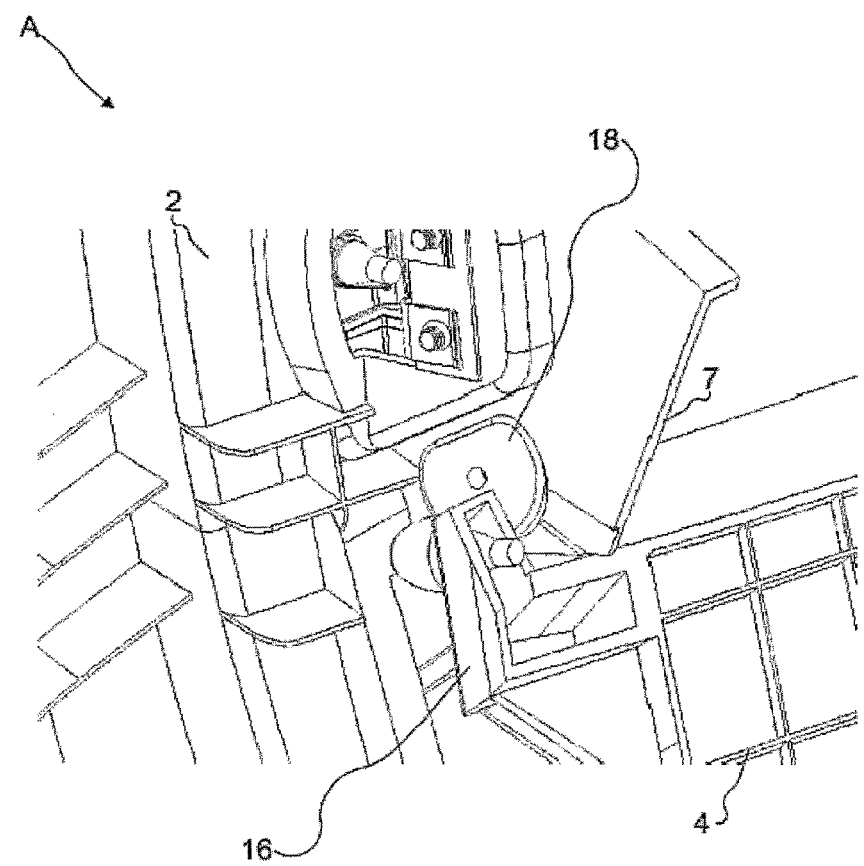
Figure 6:
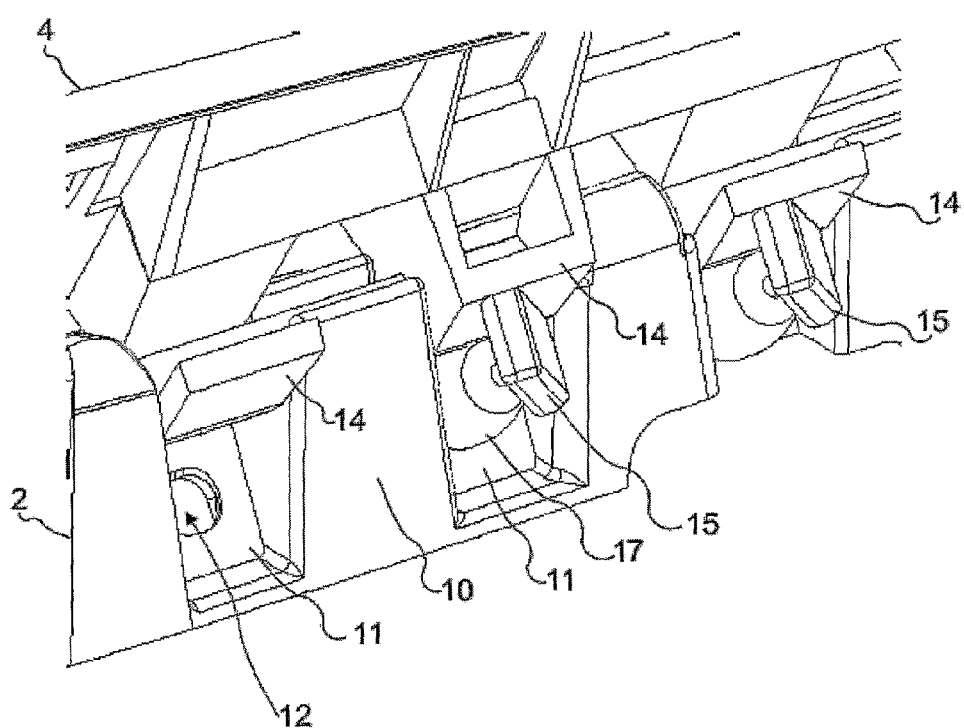
Figure 7:
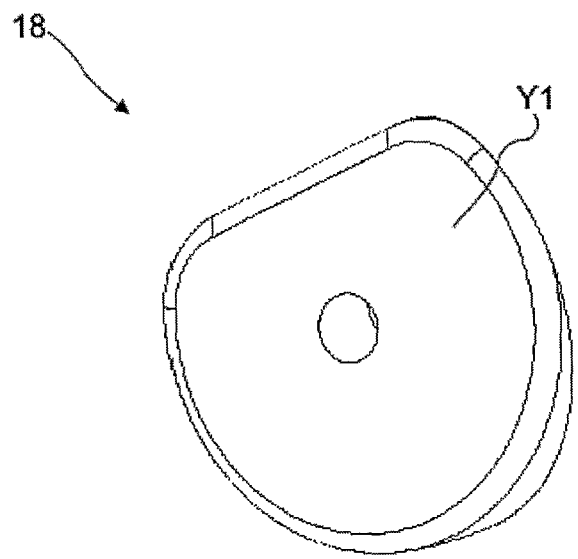
Figure 8:
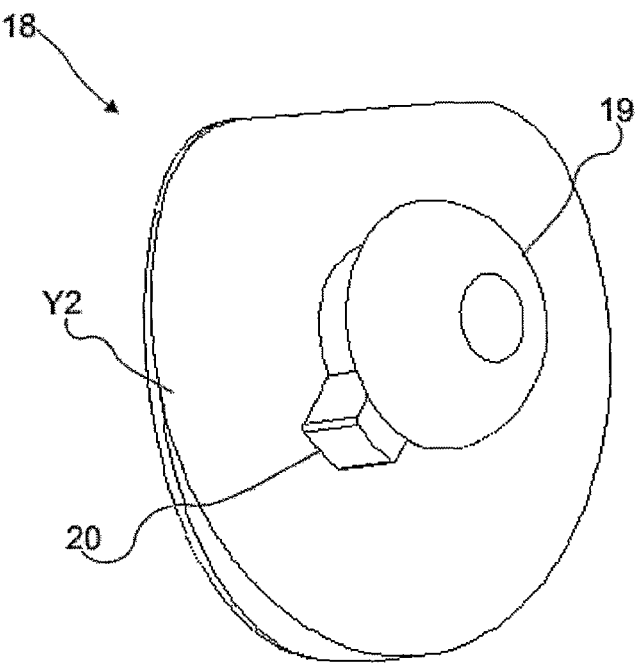
Figure 9:
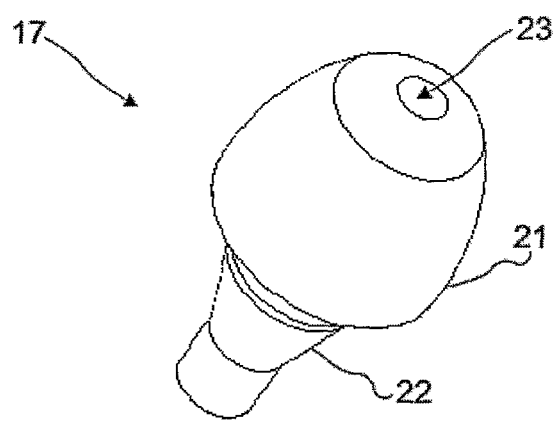
Figure 10:
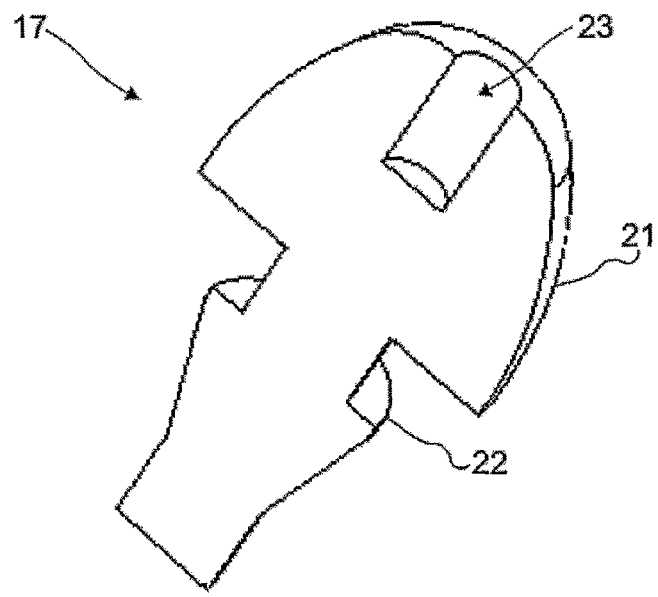
Figure 11:
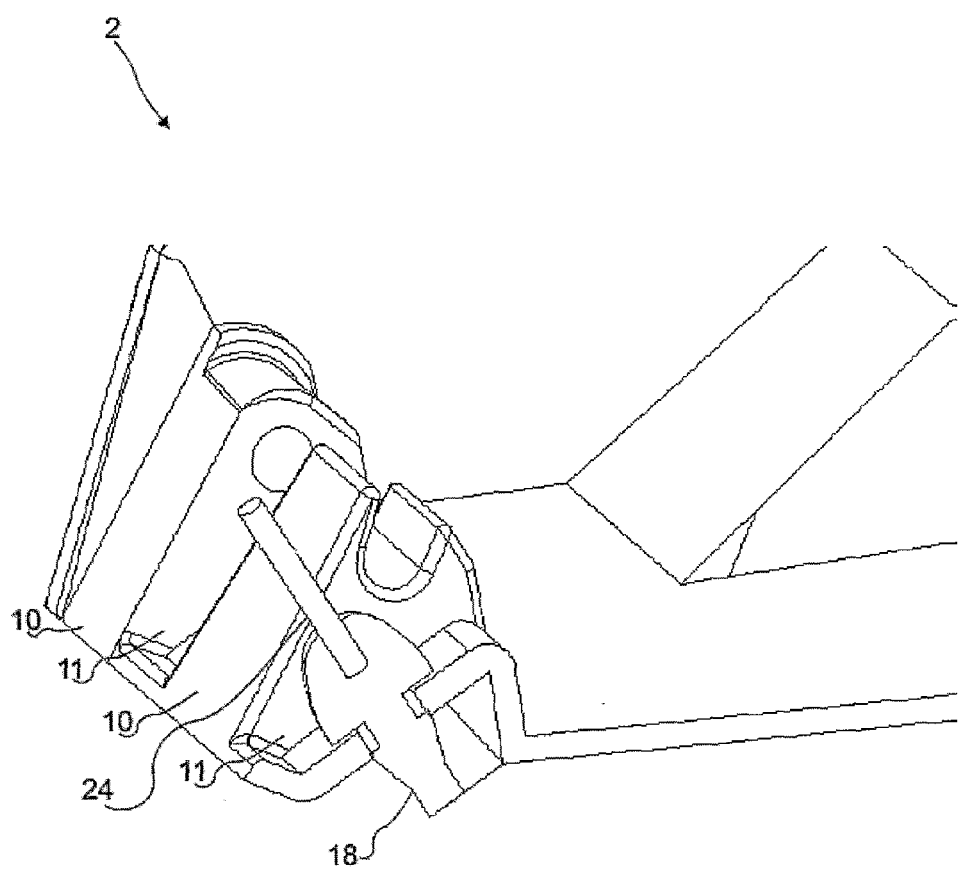
Figure 12:
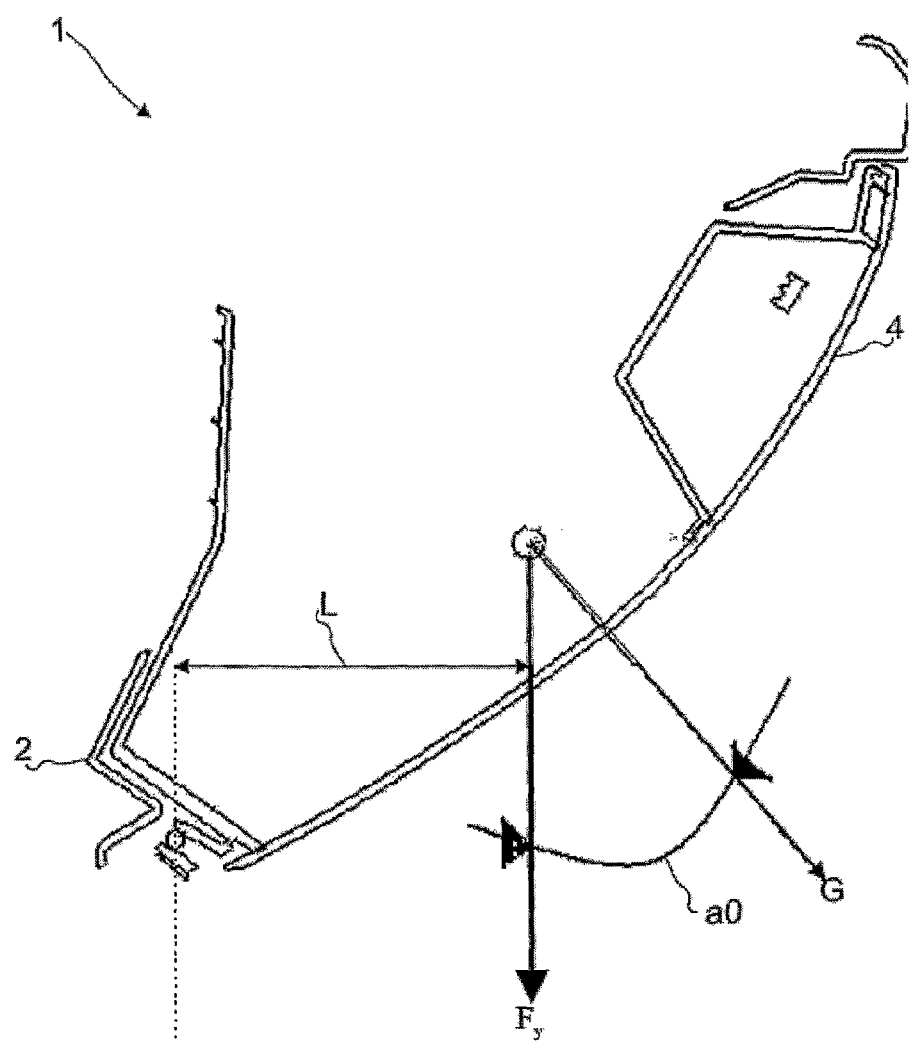
Figure 13:
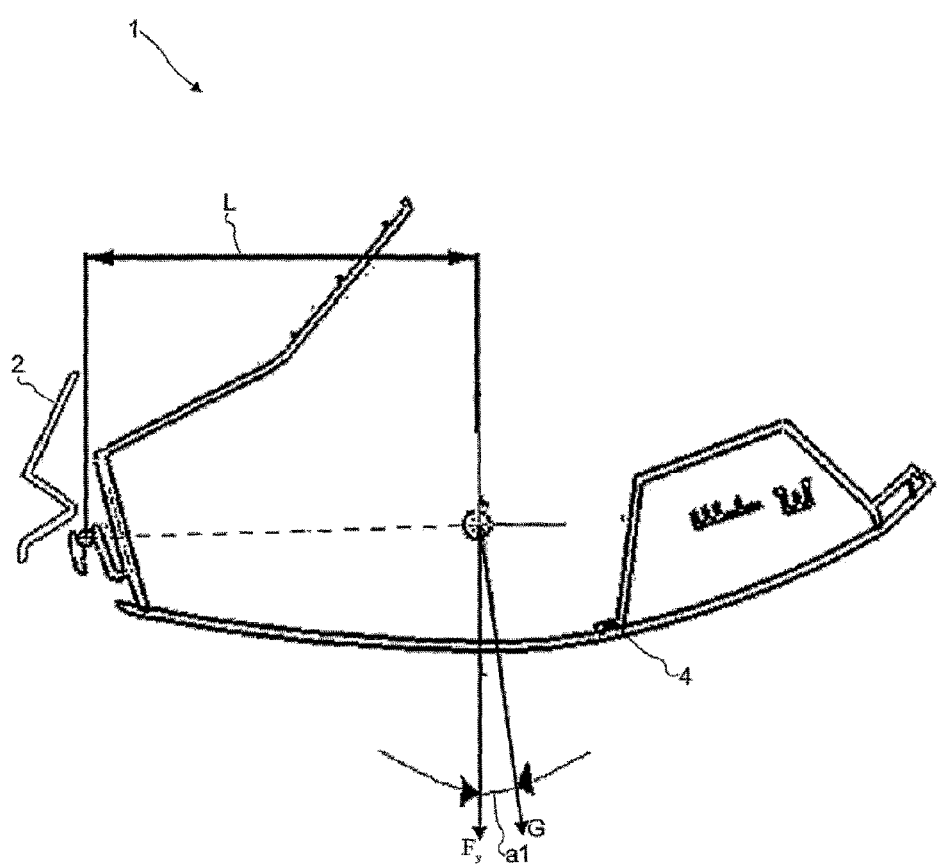

A glove and storage box assembly realized to fulfill the objective of the present invention is illustrated in the accompanying figures, in which:

FIG. 1 is the perspective view of a glove and storage box assembly,

FIG. 2 is the perspective view of the shell located in a glove and storage box assembly, FIG. 3 is the perspective view of the cover located in a glove and storage box assembly, FIG. 4 is the perspective view of the cover as mounted to the shell in a glove and storage box assembly, FIG. 5 is the detailed view of the detail A located in FIG. 4, FIG. 6 is the perspective view of the cover as mounted to the shell at the lower part thereof in a glove and storage box assembly, FIG. 7 is the front perspective view of the seal located in a glove and storage box assembly, FIG. 8 is the back perspective view of the seal located in a glove and storage box assembly, FIG. 9 is the perspective view of the motion deceleration member located in a glove and storage box assembly, FIG. 10 is the sectional view of the motion deceleration member located in a glove and storage box assembly, FIG. 11 is the perspective view of the motion deceleration member located in a glove and storage box assembly as mounted to the cover connection group, FIG. 12 is the schematic view of the first motion of the cover, located in a glove and storage box assembly, while passing from closed position to opened position, FIG. 13 is the schematic view of the cover located in a glove and storage box assembly as in opened position.

The parts illustrated in the figure are individually numbered where the numbers refer to the following:

1. Glove and storage box assembly
2. Shell
3. Clearance
4. Cover
5. Side wall
6. Abutting plate
7. Guide
8. Clearance
9. Cover connection group
10. Wall
11. Slot
12. Hole
13. Lower connection group
14. Rotation member
15. Tab
16. Surface
17. Motion deceleration member
18. Seal
19. Step
20. Extension
21. Upper surface
22. Abutting surface 23. Clearance
24. Shaft
Y1: flat surface
Y2: narrowing surface
M: moment affecting the cover in the opening direction thereof
G: cover weight
Fy: vertical component of the cover weight
a0: angle that is made by the direction of the cover weight force with vertical axis in the position wherein the cover starts the first motion from the closed position,
a1: angle that is made by the direction of the cover weight force with vertical axis in the position wherein the cover is opened The inventive glove and storage box assembly (1) essentially comprises:
at least one shell (2) which is fixed to the vehicle cockpit by being embedded and contains at least one clearance (3) which provides access to the chamber formed in the vehicle cockpit in order that articles are placed on thereof,
at least one cover (4) which is disposed on the shell (2) and ensures to access the clearance (3) from outside by opening and closing.

The shell (2) is in the form of a frame surrounding a clearance (3). One surface (hereinafter it will be called as rear surface in the description) of the shell (2) faces the vehicle cockpit and the other surface (hereinafter it will be called as front surface in the description) faces the interior of the vehicle (cabin). There are side walls (5) ensuring connection to the vehicle at the edges of the rear surface. There is an abutting plate (6) on the upper section of the rear surface (in the section against which the cover abuts) and there are at least two guides (7) extending into the cockpit from two edges of the abutting plate (6). The said guide (7) comprises at least one clearance (8).

The lower front surface of the shell (2) comprises at least one cover connection group (9) which enables the cover (4) to be connected to the shell (2) in such a way that it will make rotation motion. The cover connection group (9) is comprised of hollow slots (11) which are arranged respectively and among which there is a wall (10). There is at least one hole (12) inside the said slots (11).

The cover (4) is connected to the connection group (13) located on the lower front surface of the shell (2), by the method of shrink-fit. The cover (4) comprises a lower connection group (13) which has the structure that will be able to carry out rotational motion in the axis of the cover's (4) lower edge in order to enable the cover (4) to reach the opened position from the closed position or the closed position from the opened position, on the lower part thereof. The lower connection group (13) comprises a plurality of rotation members (14) which are arranged such that they will fit to the slots (11) and at least one tab (15) which is located at the end of the rotation member (14). The cover (4) also comprises at least two surfaces (16) which ensure abutting against the guide (7) during opening and closing.

In the inventive glove and storage box assembly (1), there is at least one motion deceleration member (17) inside the hole (12) located on the lower surface of the shell (2).

The inventive glove and storage box assembly (1) also comprises at least one seal (18) inside the clearance (8) located on the guide (7). The said seal (18) has an inclined structure. The seal (18) face (Y1) abutting against the surface of the cover (4) has a flat form and the face (Y2) thereof located on the opposite part of this face (Y1) has a narrowing form. The surface of the seal (18) facing the guide (7) comprises at least one step (19) and at least one extension (20) extending outwards on the surface (Y2) facing the guide (7) from the step (19). The said step (19) enables the seal (18) to be fixed to the guide (7) by inserting into the clearance (8) located on the guide (7), the extension (20) extending from the step (19) prevents the seal (18) to turn around its own axis.

In the preferred embodiment of the invention, the motion deceleration member (17) is a seal. The seal used as a deceleration member (17) comprises a conical upper surface (21) on which the tab (15) is disposed and an abutting surface (22) which is inserted into the hole (12) located on the slot (11) upon narrowing by stretching and which enables to lean against the rear wall of the slot (11) by broadening again after being inserted into the hole (12). Preferably, the diameter of the abutting surface (22) is smaller than the diameter of the upper surface (21). The seal also comprises at least one clearance (23) on the upper surface (21) and at least one shaft (24) inserting into the clearance (23). By means of the said shaft (24), mounting of the seal onto the shell (2) is provided rapidly and with quality. In addition, elasticity of the seal can be increased/reduced in desired level by changing the diameter of the clearance (23) located on the upper surface (21).

In the preferred embodiment of the invention, the surface (16) located on the cover (4) has an angled structure. The said surface (16) abuts against the seal (18) while the cover (4) is being opened or closed.

The seal (18) enables the energy, which may be formed during motion of the cover (4), to be damped by abutting against the surface (16). The surface (16) is pressed to the seal (18) in the opened position of the cover (4) and thus the cover (4) is enabled not to move or make any vibration.

The cover (4) which is fixed while it is in the opened position does not make any vibration while the vehicle is moving. Thus, if a cup holder is disposed on the cover (4), the liquid within the cup which is placed into the said cup holder is prevented from spilling during movement.

The user enables the surface (16) to get free from the seal (18) by pushing the cover (4) by his/her hand when the cover (4) is intended to be brought to the closed position from the opened position.

Then, the cover (4) is enabled to be closed without encountering any resistance by making use of the energy recycling which is accumulated in the motion deceleration member (17).

In the inventive glove and storage box assembly (1) the noise occurring at the time of impact is prevented by means of the surface (16) located on the cover (4) and the seal (18) against which the surface (16) abuts, as well.

In the preferred embodiment of the invention, the number of slot (11) and the number of rotation member (14) are equal to each other.

In the inventive glove and storage box assembly (1) the cover (4) reaches to the opened position from the closed position by performing free fall when it is intended to be opened. The moment (M) affecting the cover (4) in the opening direction thereof at the beginning of the movement, amounts to the multiplication of the vertical component (Fy) of the cover (4) weight (G) with the horizontal distance (L) of the cover (4) to the centre of rotation. The vertical component (Fy) of the cover (4) weight (G) amounts to the multiplication of the cover (4) weight (G) and the cosine of the angle made by this force's direction with vertical axis. The said angle has a higher value in the position wherein the cover (4) first starts movement from the closed position (a0), than the position wherein the cover (4) is opened (a1). For this reason, the multiplication of the cover (4) weight (G) with the cosine of the angle increases sinusoidally. The said tab (15) enables the speed of the cover (4) to remain constant during opening thereof by applying force to the motion deceleration member (17) in vertical and lateral direction.

$$Fy = G * \cos(a)$$

$$M = Fy * L$$

In the preferred embodiment of the invention a plurality of tabs (15) are placed on the cover (4) by giving angle, that is opposite of one another, to the tabs (15) which are symmetrical according to the center axis of the cover (4) and are located on right side and to the tabs (15) which are located on left side. Thus, the lateral thrusts applied by the motion deceleration member (17) balance each other. Therefore, rightward-leftward offset motion of the cover (4) that may occur due to the mounting clearances is prevented.

In an embodiment of the invention, a spring is used as a motion deceleration member (17). The said spring is fitted into the slot (11) by the method of shrink-fit.

Within the scope of this basic concept, it is possible to develop various embodiments of the inventive glove and storage box assembly (1). The invention can not be limited to the examples described herein; it is essentially according to the claims.

The invention claimed is:

1. A glove and storage box assembly (1) comprising:
at least one shell (2) which is fixed by being embedded to the vehicle cockpit and contains at least one clearance (3) providing access to the chamber formed in the vehicle cockpit in order that articles are placed on thereof, side walls (5) which ensure connection to the vehicle at the edges of the rear surface, an abutting plate (6) on the upper section of the rear surface, at least two guides (7) which extend into the cockpit from two edges of the abutting plate (6), comprises at least one clearance (8) and at least one cover connection group (9) which is located on the lower front surface of the shell (2)
at least one cover (4) which is disposed on the shell (2) and ensures to
access the clearance (3) from outside by opening and closing, and having a lower connection group (13) in the lower part thereof which has the structure that enables the cover (4) to reach the opened position from the closed position or the closed position from the opened position and will be able to carry out the rotational motion in the axis of the lower edge thereof, at least two surfaces (16) which has an angled structure and ensure abutting against the guide (7) during opening and closing;
and characterized by
at least one cover connection group (9) which is arranged respectively and which is comprised of hollow slots (11) among which there is a wall (10), a slot (11) in which there is at least one hole (12), a lower connection group (13) composed of a plurality of rotation members (14) which are arranged such that they will fit in the slots (11) and at least one tab (15) which is located at the end of the rotation member (14), at least one motion deceleration member (17) which is inside the hole (12) located on the lower surface of the shell (2) and having a conical upper surface (21) on which the tab (15) is disposed and an abutting surface (22) which is inserted into the hole (12) located on the slot (11) upon narrowing by stretching and which enables to lean against the rear wall of the slot (11) by broadening again after being inserted into the hole (12).

2. A glove and storage box assembly (1) according to claim 1, characterized by at least one seal (18) which inserts into the clearance (8) located on the guide (7).

3. A glove and storage box assembly (1) according to claim 2, characterized by a seal (18) the face (Y1) of which abutting against the surface of the cover (4) has a flat form and the face (Y2) of which located on the opposite part of the said face (Y1) has a narrowing form.

4. A glove and storage box assembly (1) according to claim 2, characterized by a seal (18) the surface of facing the guide (7) comprises at least one step (19) and at least one extension (20) extending outwards on the surface (Y2) facing the guide (7) from the step (19).

5. A glove and storage box assembly (1) according to claim 1, characterized by a motion deceleration member (17) which is a seal.

6. A glove and storage box assembly (1) according to claim 1, characterized by a motion deceleration member (17) which has at least one clearance (23) on the upper surface (21) thereof and at least one shaft (24) inserting into the clearance (23).

7. A glove and storage box assembly (1) according to claim 2, characterized by a motion deceleration member (17) which is a spring.

8. A glove and storage box assembly (1) according to claim 3, characterized by a seal (18) the surface of facing the guide (7) comprises at least one step (19) and at least one extension (20) extending outwards on the surface (Y2) facing the guide (7) from the step (19).

9. A glove and storage box assembly (1) according to claim 2, characterized by a motion deceleration member (17) which is a seal.

10. A glove and storage box assembly (1) according to claim 3, characterized by a motion deceleration member (17) which is a seal.

11. A glove and storage box assembly (1) according to claim 4, characterized by a motion deceleration member (17) which is a seal.

12. A glove and storage box assembly (1) according to claim 8, characterized by a motion deceleration member (17) which is a seal.

13. A glove and storage box assembly (1) according to claim 2, characterized by a motion deceleration member (17) which has at least one clearance (23) on the upper surface (21) thereof and at least one shaft (24) inserting into the clearance (23).

14. A glove and storage box assembly (1) according to claim 3, characterized by a motion deceleration member (17) which has at least one clearance (23) on the upper surface (21) thereof and at least one shaft (24) inserting into the clearance (23).

15. A glove and storage box assembly (1) according to claim 4, characterized by a motion deceleration member (17) which has at least one clearance (23) on the upper surface (21) thereof and at least one shaft (24) inserting into the clearance (23).

16. A glove and storage box assembly (1) according to claim 8, characterized by a motion deceleration member (17) which has at least one clearance (23) on the upper surface (21) thereof and at least one shaft (24) inserting into the clearance (23).

17. A glove and storage box assembly (1) according to claim 5, characterized by a motion deceleration member (17) which has at least one clearance (23) on the upper surface (21) thereof and at least one shaft (24) inserting into the clearance (23).

18. A glove and storage box assembly (1) according to claim 3, characterized by a motion deceleration member (17) which is a spring.

19. A glove and storage box assembly (1) according to claim 4, characterized by a motion deceleration member (17) which is a spring.

20. A glove and storage box assembly (1) according to claim 8, characterized by a motion deceleration member (17) which is a spring.

* * * * *